United States Patent Office 3,657,201
Patented Apr. 18, 1972

3,657,201
NOVEL ALTERNATING COPOLYMER HAVING SULFONIC ACID GROUP AND A METHOD FOR PRODUCING THEREOF
Kenji Takeya, Yoshihiro Uno, and Akira Yamane, Okayama, Japan, assignors to Sumitomo Chemical Company, Ltd., and Japan Exlan Company Ltd., both of Osaka, Japan
No Drawing. Filed Mar. 24, 1970, Ser. No. 22,367
Claims priority, application Japan, Mar. 26, 1969, 44/23,425
Int. Cl. C08f 13/00
U.S. Cl. 260—79.3 MU       16 Claims

ABSTRACT OF THE DISCLOSURE

An alternating copolymer comprising unsaturated compounds containing a sulfonic acid group (monomer of Group A) and non-substituted or substituted conjugated vinyl compounds (monomer of Group B) is prepared from the monomers of Group A such as vinylsulfonic acids, allylsulfonic acids, styrenesulfonic acids, vinyloxysulfonic acids, and allyloxysulfonic acids and the monomers of Group B such as acrylonitrile, acrylic acid, thioacrylic acid, or their derivatives using an organometallic halide such as organoaluminum halide or organoboron halide or modified catalyst thereof. The product copolymer is useful for shaping a film, fibers, or other molding or for modifying the moldings, or useful as an ion exchange resin or a readily dyeable polymer.

This invention relates to a novel alternating copolymer, and more particularly to a process for producing a novel alternating copolymer comprising unsaturated compounds containing a sulfonic acid and non-substituted or substituted, conjugated vinyl compounds.

Heretofore, Japanese patent publication No. 18,712/68 has proposed a process for producing a copolymer comprising unsaturated compounds having the following general formula:

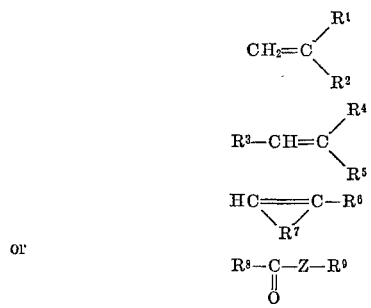

or $$R^3—C—Z—R^9$$
$$\phantom{R^3—}\overset{\|}{O}$$

wherein $R^1$ and $R^2$ represent hydrogen atoms, halogen atoms, non-polymerizable hydrocarbon residues having 1 to 20 carbon atoms, non-polymerizable hydrocarbon residues containing halogen atoms and having 1 to 20 carbon atoms, or non-polymerizable hydrocarbon residues containing a halogen atom and 1 to 20 carbon atoms; $R^3$, $R^4$, $R^5$, $R^6$ and $R^8$ represent hydrogen atoms, or non-polymerizable hydrocarbon residues having 1 to 20 carbon atoms; $R^7$ represents a non-polymerizable hydrocarbon residue having 1 to 20 carbon atoms or a non-polymerizable hydrocarbon residue containing a halogen atom and 1 to 20 carbon atoms; $R^9$ represents a non-polymerizable hydrocarbon ring residue having 1 to 20 carbon atoms, a polymerizable unsaturated hydrocarbon group containing a halogen atom and having 1 to 20 carbon atoms, or a polymerizable, unsaturated hydrocarbon residue containing a halogen atom and having 1 to 20 carbon atoms; Z is an oxygen or sulfur atom, ($R^1$ to $R^9$ may be derivative groups having other inactive substituent groups), wherein monomers of such kind will be hereinafter referred to as "monomers of Group A," and α- or β-conjugated vinyl compounds having the following general formula:

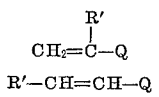

or $$R'—CH=CH—Q$$

wherein R' represents a non-polymerizable hydrocarbon residue having 1 to 20 carbon atoms, a non-polymerizable hydrocarbon residue containing a halogen atom and having 1 to 20 carbon atoms, or a halogen atom, or may be derivative groups having other inactive substituent groups; Q represents a nitrile group or a group of

(wherein Y represents a group selected from the group consisting of ZH, ZR, ZMe, NR'R", R, a halogen atom and a hydrogen atom, Z being an oxygen atom or a sulfur atom: R being an ordinary organic residue having 1 to 20 carbon atoms; R' and R" being the same or different kinds of members selected from the group consisting of a hydrogen atom and the ordinary organic residues having 1 to 20 carbon atoms, including the case that R' and R" are linked to each other also at a position of other atoms than the nitrogen atom; Me being a monovalence-designated portion of the elements of Groups I to III of the Periodic Table or an ammonium group), wherein the monomer of such kind will be hereinafter referred to as "monomers of Group B." In the proposed copolymerization reaction, which will be hereinafter referred to as "complex polymerization," organoaluminum halogen compounds, organoboron halogen compounds, mixtures of organoaluminum or organoboron compounds and aluminum or boron halide compounds, or mixtures comprising organocompounds of metals of Group IIb, IIIb or IVb of the Periodic Table and halide compounds of metals of Group IIIb or IVb of the Periodic Table, are used as the catalyst component. These polymerization reactions are characterized in that particular alternating copolymers can be selectively produced.

As a result of further studies and researches on these complex polymerizations, the present inventors have found that not only such unsaturated compounds as olefins, haloolefins, and unsaturated internal olefin compounds, and unsaturated esters of dicarboxylic acids, etc., but also unsaturated compounds containing a sulfonic acid can be used as the monomers of Group A and further that not only such conjugated monomers are acrylonitrile, and acrylic acid derivatives, and such conjugated monomers having inactive substituent groups, for example, alkyl groups, at the α or β position, as methacrylonitrile, methacrylic acid derivative and crotonic acid derivatives, but also conjugated monomers having substituent groups linking such a polar group as cyano group, ester group or amide group, through a specific alkylene group, at the α or α and β positions, can be used as the monomers of Group B. Thus, the present invention is based on such findings.

An object of the present invention is to provide a novel alternating copolymer of unsaturated compounds having sulfonic acid groups and non-substituted or substituted, conjugated vinyl compounds.

Another object of the present invention is to provide a process for producing a copolymer of unsaturated compounds containing a sulfonic acid group and non-substituted or substituted, conjugated vinyl compounds.

Other objects of the present invention will be clear from the description hereinafter.

The present invention provides an alternating copolymer composed of at least one monomer [A] and at least one monomer [B], in which:

[A] Monomers of Group A are selected from unsaturated compounds containing a sulfonic acid group having the following general formula:

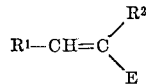

wherein $R^1$ and $R^2$ represent hydrocarbon or halohydrocarbon residues having 1 to 20 carbon atoms, a halogen atom or a hydrogen atom, at least one of $R^1$ and $R^2$ being a hydrogen atom; E is selected from $-SO_3Me$,

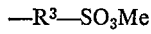

$-R^3-A-SO_3Me$, and $-A-R^3-SO_3Me$, $R^3$ represents a divalent hydrocarbon or halohydrocarbon group having 1 to 20 carbon atoms, A represents a group of $-O-R^4-$ or $-S-R^4-$ (wherein $R^4$ is a divalent hydrocarbon or halohydrocarbon group having 1 to 20 carbon atoms): Me represents a monovalence-designated portion of the elements of Groups I to III of the Periodic Table or an ammonium group, and [B] monomers are selected from conjugated compounds having the following general formula:

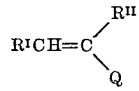

wherein $R^I$ and $R^{II}$ represent hydrocarbon or halohydrocarbon residues having 1 to 20 carbon atoms, halogen atoms, hydrogen atoms, or $(CH_2)_mQ$ groups; Q represents a nitrile or a group having the following formula:

(wherein $Y^I$ represents a group selected from the group consisting of ZR, ZMe, NR'R'', R, a halogen atom, and a hydrogen atom: Z represents an oxygen or sulfur atom; R, R' and R'' represent groups selected from the group consisting of a hydrogen atom and organic residues having 1 to 20 carbon atoms, including the case where R' and R'' are linked to each other also at a position of other atom than the nitrogen atom; Me represents a monovalence-designated portion of the elements of Groups I to III of the Periodic Table or an ammonium group); and $m$ and $m'$ represent 1 or 2.

The monomers of Group A and monomers of Group B defined above can be copolymerized by contacting with (1) an organometallic halogen compound having the following general formula:

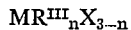

wherein M represents an aluminum or boron atom, $R^{III}$ represents an ordinary organic residue, X represents a halogen atom and $n$ represents any value of from 1 to 2, or a mixture of at least two kinds of compounds having the following general formulae:

(a) $MR^{III}_nX_{3-n}$
(b) $M'R^{IV}_3$ and
(c) $M''X'_3$ wherein M, M' and M'' represent aluminum or boron atoms; $R^{III}$ and $R^{IV}$ represent ordinary organic residues; X and X' represent halogen atoms: and $n$ represents any value of from 1 to 2, or (2) a complex of conjugated monomers coordinated with organometal halogen components obtained by mixing (a') organometallic compounds of metals of Group IIb, IIIb or IVb of the Periodic Table and (b') halogen compounds of metals of Group IIIb or IVb of the Periodic Table, wherein at least one kind of the compounds (a') and (b') is an aluminum or boron compound, in the presence of at least the conjugated monomers of the Group B among said monomers to allow these components to come in contact with one another. If necessary, the reaction can be much more promoted by carrying out the copolymerization in the presence of oxygen; an organic peroxide or, a compound of transition metal.

Furthermore, according to the present invention, a multicomponent copolymer can be produced even by using a plurality of monomer components, that is, a plurality of monomer components of Group A or a plurality of monomer components of Group B in the complex polymerization capable of producing an alternating copolymer of the monomer of Group A and the conjugated monomer of Group B. In carrying out multi-component copolymerization under a condition for producing an alternating copolymer, the monomer of Group A and the monomer of Group B generally undergo copolymerization alternatingly. For example, in the three-component copolymerization based on two components of Group B and one component of Group A, a copolymer containing 50% by mole of monomer units of Group A can be obtained. The mutual proportion of the monomer components of Group B depends upon the composition of the monomers, and thus any copolymer can be obtained by properly selecting the mutual proportion.

It is, further, possible to obtain multicomponent alternating copolymer containing other [A] group monomers than those defined above. These monomers are designated as [A'] group monomers hereinafter, which are those described as [A] group monomers in the specification of French Pat. No. 1,528,220. These [A] group monomers include terminally unsaturated olefinic hydrocarbons, internal unsaturated hydrocarbons, polyenic hydrocarbons, acetylenic hydrocarbons, $-O, -S$ or $-N$ unsaturated non-conjugated compounds and the halogen-substituted compounds thereof.

Especially, useful monomers of [A'] group are those having 2 to 30 carbon atoms and selected from α-olefins, styrenes, dienic hydrocarbons, unsaturated esters of carboxylic acids and halogen-substituted compounds thereof.

In such multicomponent alternating copolymers, [A] and [A'] group monomer units are linked only to [B] group monomer units, and [B] group monomer units are linked only to [A] or [A'] group monomer units.

The present inventors have found unexpectedly that an alternating copolymer can be obtained by using a combination of some restricted catalyst system and some restricted monomers. That is to say, the combination of monomers according to the present invention includes monomers which are well known to form said random copolymer, in addition to the monomers which have been heretofore unknown to form copolymers, but it is an unexpected fact that the combination of these monomers can produce an alternating copolymer, and such copolymers belong to quite novel compounds.

Heretofore, it is well known that an alternating copolymer can be produced by radical polymerization of some specific combination of monomer, for example, combination of maleic anhydride, maleimide, fumaric acid chloride, etc. with styrene, α-methylstyrene, etc. In addition, some similar combination is well known. It is a common feature in these well known polymerization systems capable of producing an alternating polymer, that a random copolymer is not obtained at all or hardly obtained even by changing the polymerization conditions. On the other hand, any alternating copolymer cannot be obtained from the combination capable of producing a random copolymer. In this sense, the present invention has a great significance.

According to the present invention, an alternating copolymer can be only obtained from the combination of the monomers of Group A and the monomers of Group B, as explained above, which is one of the important features of the present invention. That is to say, any alternating copolymer cannot be obtained from the monomers of Group B or from the monomers of group A alone.

Furthermore, the alternating copolymer of the present invention cannot be obtained by means of every catalyst component. According to the present invention, it is essential that the catalyst system contains aluminum or boron, organic groups and halogen atoms. For example, any alternating copolymer cannot be obtained by means of a trialkyl aluminum or a boron halide alone. This is one of features of the present invention.

Another important feature of the present invention is that the monomers of Group B are coordinated with metal compounds. Particularly, a coordination with metal compounds containing halogen atoms is important, and it is presumed that the copolymerization reaction can proceed through the formation of such coordinated complex, which seems to be an important factor for producing the alternating copolymer.

In addition to the importance of the simultaneous presence of the metal, the organic groups and the halogen atoms and the restriction of the combination of the monomers, further peculiarity of the present invention is that the presence of a polar solvent or polar substance is generally not suitable and particularly any component capable of forming a complex with the metal component is not desirable in the present invention. On the other hand, in the conventional radical polymerization the polarity of a solvent has usually no essential influence upon the polymerization reaction. For example, such ethers as ethyl ether, tetrahydrofurane, dioxane, etc., such ketones as acetone, esters, nitriles or dimethylformamide, are not used in the present invention. Alcohols as well as water are not suitable in the present invention.

In the present invention, the polymerization can be generally promoted by carrying out the reaction in the presence of an oxygen, an organic peroxide or a compound of transition metal. Furthermore, the polymerization can be carried out effectively with a relatively small amount of catalyst.

The monomers of Group A used in the present invention are unsaturated compounds containing a sulfonic acid group and can be represented by the following general formulae:

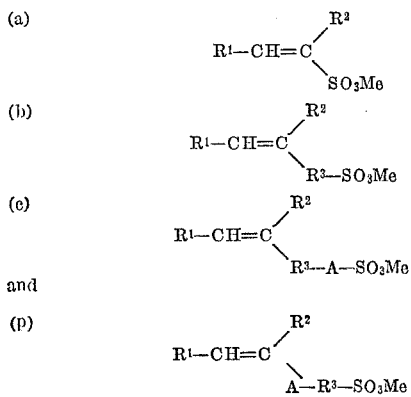

wherein the symbols are the same as defined hereinbefore in the formula

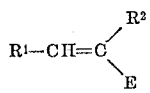

Preferable examples of these hydrocarbon groups designated at $R^1$, $R^2$ and $R^4$ include alkyl, aryl, aralkyl, alkylaryl, cycloalkyl, and bridged ring hydrocarbon groups or those having halogen atoms as substituents. Preferable examples of the divalent hydrocarbon groups as represented by $R^3$ include alkylene, phenylene and aralkylene groups or those having halogen atoms as substituents. Chlorine atom, bromine atom, iodine atom and fluorine atom are used as halogen atoms. Further, preferable examples of the elements of Groups I to III of the Periodic Table, as represented by Me, include lithium, sodium, potassium, rubidium, cesium, copper, silver, beryllium, calcium, strontium, barium, magnesium, zinc, cadmium, mercury, boron, aluminum, gallium, etc.

According to the monovalence desibnation used in the present specification, Me will be Me'/2 for the divalent elements, if Me' represents the elements of Groups II to III of the Periodic Table, and Me will be Me'/3 for the trivalent elements. That is to say, a compound represented by the following general formula corresponds to the divalent element:

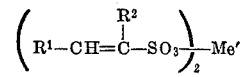

and a compound represented by the following general formula corresponds to the trivalent element:

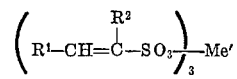

Preferable compounds are the salts of alkenylsulfonic acids, alkenylhydrocarbylsulfonic acids, alkenyloxyhydrocarbylsulfonic acids and halogen-substituted compounds thereof.

Especially, salts of vinylsulfonic acid, allylsulfonic acid, styrenesulfonic acid, vinyloxyhydrocarbylsulfonic acid, allyloxyhydrocarbylsulfonic acid and their homologs are representative as these compounds. Their homologs mean the compounds substituted with hydrocarbon, halohydrocarbon radicals or halogen atoms. Examples of these A group compounds include sodium salts, potassium salts, lithium salts, calcium salts, magnesium salts and ammonium salts of vinylsulfonic acid, α-methylvinylsulfonic acid, β-methylvinylsulfonic acid, α-chlorovinylsulfonic acid, β-chlorovinylsulfonic acid, metallylsulfonic acid, β-chloroallylsulfonic acid, alloyloxyethylsulfonic acid, methallyloxyethylsulfonic acid, vinyloxyisopropylsulfonic acid, styrenesulfonic acid, vinyltoluenesulfonic acid, vinylethylbenzenesulfonic acid, isoprope-nylethylbenzenesulfonic acid, 2 - chlorostyrenesulfonic acid, 2,4 - dichlorostyrenesulfonic acid, 2 - methyl - 4-chlorostyrenesulfonic acid, 2,4 - dichloro - 6 - methyl-styrenesulfonic acid, 2 - chloroisopropenylbenzenesulfonic acid, vinyloxybenzenesulfonic acid, allyloxybenzenesulfonic acid, methallyloxybenzenesulfonic acid, 2-ethyl-allyloxybenzenesulfonic acid, 2 - propylallyloxybenzene-sulfonic acid, etc.

The monomers of Group B having the formula:

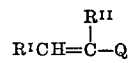

include the following four typical compounds (1)

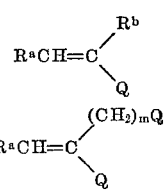

(2)

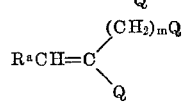

(3)

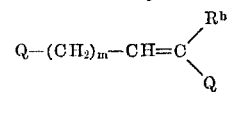

or (4)

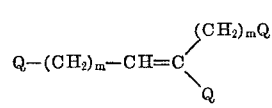

wherein $R^a$ and $R^b$ each is a hydrocarbon or halohydrocarbon group having 1 to 20 carbon atoms, a halogen atom or a hydrogen atom, Q represents a nitrile group or group of

(wherein $Y^I$ is the same as defined above). Preferable ordinary organic residues having 1 to 20 carbon atoms, as represented by R, R' or R" in $Y^I$ are ordinary hydrocarbon residues, or their derivative groups. For example, alkyl, alkenyl, aryl, aralkyl, alkylaryl and cycloalkyl groups can be mentioned as such ordinary hydrocarbon residues.

As halogen atoms, chlorine atom, bromine atom, iodine atom and fluorine atom can be used. Me represents a monovalence-designated portion of the elements of Groups I to III of the Periodic Table or an ammonium group. As such elements, for example, lithium, sodium, potassium, rubidium, cesium, copper, silver, beryllium, calcium, strontium, barium, magnesium, zinc, cadmium, mercury, boron, aluminum, gallium, etc. can be mentioned. According to the monovalence designation defined herein, Me will be Me'/2 for the divalent elements, if Me' represents the metallic elements of Groups II to III of the Periodic Table, and Me will be Me'/3 for the trivalent elements. That is to say, a compound represented by the following general formula corresponds to the divalent element:

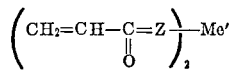

and a compound represented by the following general formula corresponds to the trivalent element:

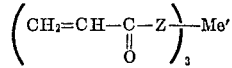

Among these compounds, particularly a monovalent salt, that is, the salts of elements of Group I, and ammonium salts are preferable. Inclusion of those whose R' and R" are mutually linked to each other also by other atoms than N atom in NR' R" means that the following groups, for example, morpholino group, pyrrolidino group or piperidino group, are contained:

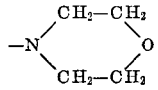

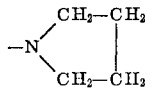

or 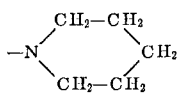

In the case that both $R^I$ and $R^{II}$ are hydrogen atoms, the monomers will be acrylonitrile or compounds of acrylic acid or thioacrylic acid series. Examples of these compounds include acrylonitrile, acrylic esters, thiolacrylic ester, acrylamide, N-substituted acrylamide, N,N-disubstituted acrylamide, acrylic acid halide, acrylic acid, thioacrylic acid, and their salts; acrolein and vinylketones.

In the case that either $R^a$ or $R^b$ is a hydrogen atom, the other remaining group is a hydrocarbon residue, a hydrocarbon residue containing halogen atoms or a halogen atom. The hydrocarbon residue can be a derivative group containing other inactive substituent group. As the hydrocarbon residue, for example, alkyl, aryl, aralkyl, alkylaryl and cycloalkyl groups are usually used. The halogen atoms or those used as the substituent groups are chlorine atom, bromine atom, iodine atom and fluorine atom. That is to say, said compounds are α- or β-substituted acrylonitrile or compounds of acrylic acid and thioacrylic acid series. Examples of these compounds include methyl acrylate, ethyl acrylate, n-butyl acrylate, n-amyl acrylate, 2-ethylhexyl acrylate, octadecyl acrylate, allyl acrylate, O-tolyl acrylate, benzyl acrylate, cyclohexyl acrylate, 2-chloroethyl acrylate, β-chloroallyl acrylate, methyl thiolacrylate, ethyl thiolacrylate, acrylamide, N-methylacrylamide, N-n-butylacrylamide, N-2-ethylhexylacrylamide, N-stearylacrylamide, N-cyclohexylacrylamide, N - toluylacrylamide, N,N - dimethylacrylamide, N-methyl-N-ethylacrylamide, acrylmorpholine, acrylpyrrolidine, acrylic acid chloride, acrylic acid bromide, acrylic acid, thiolacrylic acid, sodium acrylate, potassium acrylate, zinc acrylate, aluminum acrylate, ammonium acrylate, acrolein, methylvinylketone, ethylvinylketone, and phenylvinylketone.

Furthermore, examples of α- or β-substituted, conjugated vinyl compounds include methyl methacrylate, ethyl methacrylate, butyl methacrylate, octadecyl methacrylate, benzyl methacrylate, phenyl methacrylate, toluyl methacrylate, cyclohexyl methacrylate, 2 - chloroethyl methacrylate, methyl thiolmethacrylate, ethyl thiolmethacrylate, methyl α-ethylacrylate, ethyl α-butylacrylate, methyl α - cyclohexylacrylate, methyl α - phenylacrylate, methyl α-chloroacrylate, methyl α-bromoacrylate, methyl α-chloromethylacrylate, methyl α-(p-chlorophenyl) acrylate, methacrylamide, N-ethylmethacrylamide, N-cyclohexylmethacrylamide, N,N - dimethylmethacrylamide, methacrylpiperidine, α-ethylacrylamide, α-chloroacrylamide, α-chloromethylacrylamide, methacrylic acid chloride, α-chloracrylic acid chloride, α-ethylmethacrylic acid chloride, methacrylic acid, thiolmethacrylic acid, sodium methacrylate, zinc methacrylate, aluminum methacrylate, ammonium α-fluoro acrylic acid, methacrolein, methylisopropenylketone, 1 - chlorobutenylethylketone, methacrylonitrile, α-ethylacrylonitrile, α-ethylacrylonitrile, α-cyclohexylacrylonitrile, α - chloroacrylonitrile, α - chloromethylacrylonitrile, ethyl crotonate, phenyl crotonate, crotonamide, crotonic acid chloride, crotonitrile, methyl cinnamate, butyl cinnamate, chloromethyl cinnamate, cinnamonitrile, methyl β-ethylacrylate, methyl β-chloromethylacrylate, etc.

The compounds as represented by the general formula (2), (3) or (4) include α-, β- or α,β-substituted acrylic acid esters, thiolacrylic acid esters, acrylamides, N-substituted acrylamides, N,N-disubstituted acrylamides, acrylic acid halides, acrylic acids, thiolacrylic acids, acrylates, thiolacrylates, acrolein, vinylketones and acrylonitrile. Preferable substituents are cyanoalkyl, carboxyalkyl, and hydrocarbyloxyalkyl groups. Examples of these compounds include methyl β-cyano-β-methylenepropionate, ethyl β-cyano-β-methylene propionate, propyl β-cyano-β-methylenepropionate, butyl β-cyano-β-methylenepropionate, benzyl β-cyano-β-methylenepropionate, phenyl β-cyano-β-methylenepropionate, monomethyl itaconate, dimethyl itaconate, monoethyl itaconate, diethyl itaconate, dipropyl itaconate, dibutyl itaconate, diphenyl itaconate, dibenzyl itaconate, itaconic acid chloride, sodium itaconate, zinc itaconate, ammonium itaconate, α-methyleneglutaronitrile, α-methyleneglutaroamide, N,N-dimethyl-α-methyl-α-methyleneglutaroamide, dimethyl α-methylenesuccinate, dipropyl α-methylenesuccinate, dibutyl α-methylenesuccinate, diphenyl α-methylenesuccinate, dibenzyl α-methylenesuccinate, dimethyl glutaconate, diethylglutaconate, dipropyl glutaconate, dibutyl glutaconate, diphenyl glutaconate, dibenzyl glutaconate, methyl γ-cyanocrotonate, ethyl γ-cyanocrotonate, propyl γ-cyanocrotonate, butyl γ-cyanocrotonate, phenyl γ-cyanocrotonate, benzyl γ-cyanocrotonate, ethyl γ-N,N-dimethylamidocrotonate, β-cyanomethylacrylamide, β-cyanomethyl-N,N-dimethylacrylamide, dimethyl α-(β - N,N-dimethylamide) ethylidenesuccinate, diethyl α-(β - N,N - dimethylamide) ethylidenesuccinate, dibutyl α-(β - N,N - dimethylamide) ethylidenesuccinate, diphenyl α-(β - N,N - dimethylamide) ethylidenesuccinate and dibenzyl α-(β - N,N - dimethylamide)ethylidenesuccinate.

The catalyst component used in the present invention is (1) a compound represented by the general formula, $MR^{III}_n X_{3-n}$, $M'R^{IV}_3$ or $M''X'_3$, wherein M, M' and M'' represent aluminum atoms or boron atoms; $R^{III}$ and $R^{IV}$ represent ordinary organic residues; X and X' represent halogen atoms; $n$ represents any number of from 1 to 2, or (2)(a) an organic compound of a metal of Groups IIb, IIIb and IVb of the Periodic Table and a halogen compound of a metal of Groups IIIb and IVb of the Periodic Table. In the aluminum or boron compound represented by the general formula, $MR^{III}_n X_{3-n}$, $M'R^{IV}_3$ or $M''X'_3$, hydrocarbon residues having 1 to 20 carbon atoms are particularly preferable as $R^{III}$ and $R^{IV}$ or their derivative group having an inactive substituent group can be also effectively used. For example, the compound having alkyl groups, alkenyl groups, aryl groups, aralkyl groups, alkylaryl groups, cycloalkyl groups, etc. are preferable. Examples of such groups include methyl, ethyl, propyl, butyl, hexyl, octyl, decyl, dodecyl, stearyl, phenyl, toluyl, naphthyl, benzyl, cyclopentadienyl, cyclohexyl etc. As X and X', chlorine atom, bromine atom, iodine atom and fluorine atom are used.

Examples of the compounds having the general formula of $M'''R_n X_{3-n}$ include methylaluminum dichloride, ethylaluminium dichloride, isobutylaluminum dichloride, hexylaluminum dichloride, dodecylaluminum dichloride, phenylaluminum dichloride, cyclohexylaluminum dichloride, methylaluminum dibromide, ethylaluminum diiodide, allylaluminum dichloride, ethylaluminum sesquichloride, ethylaluminum sesquibromide, ethylaluminum sesquifluoride, methylaluminum sesquichloride, diethylaluminum fluoride, ethylphenylaluminum chloride, dicyclohexylaluminum chloride, methylboron dichloride, ethylboron dichloride, ethylboron diiodide, butylboron dichloride, hexylboron dichloride, dodecylboron dichloride, phenylboron dichloride, benzylboron, dichloride, cyclohexylboron dichloride, diethylboron bromide, dipropylboron chloride, dibutylboron chloride, dihexylboron chloride, ethylvinylboron chloride, and dicyclopentadienylboron chloride.

Examples of the compounds having the general formula of $M'R^{IV}_3$ include trimethylaluminum, tripropylaluminum, tributylaluminum, trihexylaluminum, tridecylaluminum, triphenylaluminum, tricyclohexylaluminum, tribenzylaluminum, trimethylboron, triethylboron, tributylboron, trihexylboron, diethylphenylboron, diethyl-p-toluylboron, and tricyclohexylboron.

Examples of the compounds having the general formula of $M''X'_3$ include aluminum trichloride, aluminum tribromide, aluminum triiodide, partially fluorinated aluminum chloride, boron trichloride, boron trifluoride, boron tribromide and boron triiodide.

The organic compounds of metals of Groups IIb, IIIb and IVb of the Periodic Table as the catalyst (2) of the present invention are those having zinc, cadmium, silver, boron, aluminum, gallium, indium, thalium, germanium, tin, lead, etc. as their metallic components. Particularly, such metallic components as zinc, boron, aluminum and tin are usually used. The preferable organic groups are the ordinary hydrocarbon groups or their derivative groups. Particularly those having an alkyl, alkenyl, aryl, aralkyl, alkylaryl, cycloalkyl or the like groups are effective. Metallic components are used together with other groups than the organic groups. Particularly, organometallic compounds having the general formula of $M'''R^V_n X''_{p-n}$, wherein $M'''$ represents a metal of the Groups IIb, IIIb and IVb of the Periodic Table; $R^V$ represents a hydrocarbon group having 1 to 20 carbon atoms or its derivative group; X'' represents a halogen atom; $p$ represents a valence of the metal; $n$ is any value of from 1 to $p$, are useful, and particularly effective where $n=p$. Any organometallic compound containing other metal of Groups IIb, IIIb and IVb of the Periodic Table can be used, of course, if required.

Examples of these compounds include diethylzinc, ethylzinc chloride, diethylcadmium, diethylmercury, diphenylmercury, triethylboron, tributylboron, tricyclohexylboron, ethylboron bromide, triethylaluminum, tributylaluminum, trihexyaluminum, tricyclohexyaluminum, vinyldiethylaluminum, diethylaluminum chloride, ethylaluminum sesquichloride, ethylaluminum dichloride, trimethylgallium, triethylgallium, triethylindium, tetraethylgermanium, tetramethyltin, tetraethyltin, tetraisobutyltin, dimethyldiethyltin, tetraphenyltin, tetrabenzyltin, diethyldiphenyltin, triethyltin chloride, diethyltin dichloride, ethyltin trichloride, tetramethyllead, tetraethyllead, dimethyldiethyllead, and triethyllead chloride.

On the other hand, the metal halogen compounds used in the present invention are halogen compounds of metals of Groups IIIb and IVb of the Periodic Table, for example, the compounds containing boron, aluminum, gallium, indium, thallium, germanium, tin and lead. Halogan atoms used in the present invention are chlorine atom, bromine atom, iodine atom and fluorine atom. The metal halogen compounds having other groups than the halogen atoms can be also used in the present invention.

Particularly, the preferable metal halogen compounds for the present invention are those represented by the general formula, $M^{IV}X'''_m R^{VI}_{q-m}$, wherein $M^{IV}$ represents a metal of Groups IIIb and IVb of the Periodic Table; X''' represents a halogen atom; $R^{VI}$ represents a hydrogen group having 1 to 20 carbon atoms or its derivative groups; $q$ represents the valence of the metal; $m$ is any value of from 1 to $q$. Generally, a good result is liable to be obtained where $m=q$. Other halogen compounds of metals of Groups IIIb and IVb of the Periodic Table can be, of course, also used, if necessary.

Examples of the metal halogen compounds useful for the present invention include boron trichloride, boron trifluoride, boron bromide, boron triiodide, ethyl boron dichloride, diethylboron chloride, aluminum trichloride, aluminum tribromide, aluminum triiodide, partially fluorinated aluminum chloride, ethylaluminum dichloride, methylaluminum dibromide, ethylaluminum sesquichloride, diethylaluminum chloride, gallium trichloride, gallium dichloride, germanium tetrachloride, tin tetrachloride, tin tetrabromide, tin tetraiodide, ethyltin trichloride, methyltin trichloride, phenyltin trichloride, dimethyltin dibromide, diethyltin chloride, diisobutyltin chloride, triethyltin chloride, lead tetrachloride, and diethyllead dichloride.

When the organic compound of the metal of Groups IIb, IIIb and IVb of the Periodic Table and the halogen compound of the metal of Groups IIIb and IVb of the Periodic Table is used as the catalyst (2), the organometallic compound and the metal halogen compound can be used without mixing these compounds in advance. A good result is liable to be obtained at least by mixing the conjugated vinyl compound with a metal halogen compound in advance and then adding an organometallic compound thereto.

The organic peroxides used in the present invention are ordinary organic compounds having a peroxide bond, for example, diacyl peroxides, ketone peroxides, aldehyde peroxides, ether peroxides, hydroperoxides, ester peroxides, dihydrocarbyl percarbonates, and percarbamates. Examples of these compounds include benzoyl peroxide, lauroyl peroxide, 2,4-dichlorobenzoyl peroxide, 4-chlorobenzoyl peroxide, acetyl peroxide, stearoyl peroxide, phthaloyl peroxide, methylethylketone peroxide, cyclohexanone peroxide, t-butylhydroperoxide, p-menthane hydroperoxide, diisopropylbenzene hydroperoxide, cumene hydroperoxide, di-t-butyl peroxide, dicumyl peroxide, t-butylcumyl peroxide, t-butyl perbenzoate, t-butyl perisobutyrate, t-butyl peracetate, t-butyl peroxypivalate, phenyl percarbamate, diisopropyl percarbonate, t-butyl perisopropylcarbonate, etc., but are not limited thereto. There is such a tendency that the promoting action by these peroxides is greater with an increase in its radical decomposition speed.

The preferable compound of a transition metal of Groups IVa, Va, VIa, VIIa or VIII of the Mendeleeff's Periodic Table, which is used in the present process, is a compound containing at least one member selected from the group consisting of a halogen atom and alkoxy, β-diketo and acyloxy groups. These groups, i.e. alkoxy, β-diketo and acyloxy groups, have, respectively, the formulae

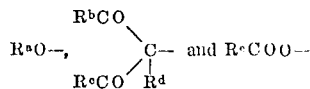

wherein $R^a$, $R^b$, $R^c$, $R^d$, and $R^e$ are individually a hydrocarbon residue. The halogens are preferably chlorine, bromine and iodine. The β-diketo groups are preferably acylacetonyl groups, particularly acetylacetonyl and benzoylacetonyl groups. The hydrocarbon residues in the above-mentioned groups may be any of those having, for example, alkyl, aryl, aralkyl, alkylaryl and cycloalkyl groups, and, particularly, groups having 1 to 20 carbon atoms are preferable. Examples of the transition metal of Groups IVa, Va, VIa, VIIa, and VIII of the Mendeleeff's Periodic Table are titanium, zirconium, vanadium, chromium, molybdenum, tungsten, manganese, iron, cobalt, nickel, palladium, rhodium and platinum. Among these, titanium, zirconium, vanadium, chromium, iron, cobalt and nickel are preferable, and particularly, the use of vanadium and cobalt gives favorable results. These transition metal compounds may adequately have at least one member selected from the group consisting of halogens and alkoxy, β-diketo and acyloxy groups. Alternatively, those containing said groups in admixture of two or more or in combination with other groups may also be used.

Examples of these compounds include titanium tetrachloride, titanium trichloride, di-n-ethoxytitanium dichloride, n-butyl orthotitanate, dititanium diacetylacetonate hexachloride, dicyclopentadienyltitanium dichloride, zirconium tetrachloride, zirconium tetraacetylacetonate, vanadium tetrachloride, vanadyl trichloride, triethyl orthovanadate, vanadylethoxy dichloride, vanadyldiamyloxy monochloride, vanadium trisacetylacetonate, vanadium trisbenzoylacetonate, vanadyl diacetylacetonate, vanadyl acetylacetonate dichloride, dicyclopentadienylvanadium dibromide, vanadium acetate, vanadium stearate, chromium trichloride, chromium trisacetylacetonate, manganese trisacetylacetate, iron trichloride, iron trisacetylacetonate, cobalt dichloride, cobalt trisacetylacetonate, cobalt naphthenate, cobalt stearate, nickel dichloride, nickel diacetylacetonate and nickel stearate.

In carrying out the present invention, the catalyst components can be used in any proportion, but a proportion of 0.001 to 10 moles, particularly 0.005 to 1.5 moles of the catalyst components per mole of the monomer of Group B is frequently used. Generally speaking, a good result is liable to be obtained when an almost equimolar amount of the metal halogen compound is used for the monomer of Group B. Of course, it is possible to use an excess amount or a small amount of the metal halogen compound.

Generally at the relatively low concentration the polymerization can be effectively carried out in the presence of oxygen, the organic peroxide, and the compounds of transition metal. The effect of the organic peroxide, the compound of transition metal or the oxygen is remarkable even at such a low temperature as −78° C. Sufficiently great effect can be expected, even if a relatively small amount of the organic peroxide, the compound of transition metal or oxygen is used. For example, a promoting action is observable when about 0.001 to 20 mole percent, especially 0.01 to 5% by mole thereof is added to the reaction system on the basis of the monomers of Group B. Of course, it is possible to effectively use it at a concentration higher or lower than said percentage.

Generally speaking, a preferable result can be obtained when the metal halogen compound is allowed to come in contact with the monomers of Group B in a state free of the oxygen or organic peroxide to effect complex formation. However, the catalyst component can be added later to the monomer mixture, depending upon the conditions.

The polymerization temperature can be selected from such a low temperature as −150° C. to such a high temperature as +100° C. The present copolymerization reaction promptly proceeds even at a very low temperature.

The copolymerization is effected under an arbitrary pressure ranging from a reduced pressure to a pressure of up to 100 kg./cm.². Generally, the reaction proceeds easily under the atmospheric pressure.

In carrying out the present invention, it is possible to effect bulk polymerization in liquid monomers. Generally ordinary hydrocarbons or hydrocarbon compounds containing halogen atoms are used as inactive solvents. Examples of such solvents include propane, butane, pentane, hexane, heptane, octane, ligroin, petroleum ether, or other petroleum solvent mix; benzene, toluene, xylene, cyclohexane, methylcyclohexane, methylene dichloride, ethylene dichloride, trichloroethylene, tetrachloroethylene, butyl chloride, chlorobenzene and bromobenzene. As have been already explained, the compounds capable of forming stable complexes with the catalyst components are not preferably as the solvents.

After the completion of polymerization reaction, after-treatment is carried out according to the conventional method, to purify and recover the formed copolymer. The conventional method includes, for example, an alcohol treatment, an alcohol-hydrochloric acid treatment, a hydrochloric acid-water treatment, an alkali treatment, or the other after-treatment used in the cationic polymerization based on a Lewis acid or the polymerization based on the Ziegler-Natta type catalyst. These methods are used, where desired.

Furthermore, it is also possible to separate and recover the catalyst components from the formed polymer, for example, by adding a compound capable of forming a complex with the catalyst components without decomposing the catalyst components.

The alternating copolymer obtained according to the present invention is useful as a polymer for shaping a film, fibers or other moldings, and also useful as a polymer for modifying the moldings. Furthermore, the alternating polymer of the present invention is useful as an ion exchange resin or a readily dyeable polymer.

Now, the present invention will be explained, referring to examples, but not limited to these examples. The percentage shown in examples is by weight, unless otherwise notified.

EXAMPLE 1

Fifty-seven m-mole of acrylonitrile and 10 ml. of a toluene solution containing 5.6 mole/l. of ethylaluminum dichloride (EtAlCl₂) were added to a four-necked glass flask having a capacity of 100 ml., provided with a stirrer, a nitrogen gas inlet, a dropping funnel and a thermometer at −15° C. under a nitrogen atmosphere, mixed and elevated to 20° C. with good stirring. Then, 58 m-mole of potassium p-styrene-sulfonate was added thereto, and the polymerization was immediately started. It was hard to continue stirring two hours after the start of the polymerization. The polymerization was stopped with a hydrochloric acid-acidified methanol 2 hours after the start of the polymerization and the resulting copolymer was separated and purified, whereby 4.5 g. of white solid polymers were obtained. The thus obtained copolymer was insoluble in the ordinary organic solvent, but readily soluble in nitric acid. As a result of sulfur analysis of said copolymer by a fluorescent X-ray analytical method, the sulfonic acid content of the copolymer was 33.9% and was in a good accordance with the calculated value, 34.3% in the case of the 1:1 alternating copolymer.

Furthermore, the polymerization was carried out by changing the proportion of monomers variously under the same polymerization conditions, and it was found that the sulfonic acid contents of the resulting copolymers by the sulfur analysis were in almost good accordance with the calculated value of the 1:1 alternating copolymer. Thus, it was seen that the alternating copolymer was formed. Furthermore, a nuclear magnetic resonance spectrum analysis revealed that the resulting copolymer was clearly different from that copolymerized in a molar ratio of 1:1 by radical polymerization and that the copolymer had characteristics of the alternating copolymer.

Furthermore, similar copolymers were obtained under the same polymerization conditions using diethylboron chloride, methylaluminum sequibromide or a mixture of trihexyl aluminum-aluminum chloride, in place of ethyl-aluminum sesquichloride.

EXAMPLE 2

3.9 grams of copolymer was obtained in the same apparatus in the same manner as in Exmple 1, except that sodium methallylsulfonate was used in place of potassium p-styrenesulfonate of Example 1 and 0.2 g. of benzoyl peroxide was used as a polymerization promoter. The intrinsic viscosity of the nuclear copolymer in 13 N nitric acid at 30° C. was 0.2 dl./g. and the sulfonic acid content of the copolymer was 44.7% and was in a good accordance with the calculated value, 43.1%, in the case of the 1:1 alternating copolymer. Furthermore, similar result was obtained when α-methyleneglutaronitrile was used in place of acrylonitrile.

EXAMPLE 3

3.96 grams of methyl acrylate, 5 ml. of a toluene solution containing 60% of ethylaluminum sesquichloride ($Et_3Al_3Cl_3$) and 5 ml. of toluene were added to a four-necked glass flask having a capacity of 100 ml. provided with a stirrer at —10° C. under a nitrogen atmosphere, mixed and then elevated to 10° C. with good stirring. Then, 6.00 g. of sodium vinylsulfonate was added thereto and reaction was continued for 5 hours. The polymerization reaction was stopped by hydrochloric acid-acidified methanol, and the formed copolymer was separated, whereby 0.75 g. of white solid copolymer was obtained. In the infra-red spectrum analysis of said polymer, absorptions of sulfonic acid ($D_{SO_2}$) and ester ($D_{C=O}$) were recognized remarkable. Composition (molar ratio) of both components in the copolymer was obtained from their absorption intensities, whereby it was found that methyl acrylates/sodium vinylsulfonate was 51/49, which was in good accordance with the theoretical value of the 1:1 alternating copolymer.

EXAMPLE 4

Sixty m-mole of N,N-dimethylacrylamide and 20 ml. of a toluene solution containing 30 m-mole each of diethylzinc and aluminum tribromide, and then 80 m-mole of potassium p-styrenesulfonate was added to a four-necked glass flask having a capacity of 100 ml. provided with a stirrer at —20° C. under a nitrogen atmosphere and elevated to 30° C. with good stirring. The reaction was continued for 15 hours.

The polymerization reaction was stopped with hydrochloric acid-acidified methanol, whereby 4.3 g. of whitish grey solid was obtained. Elemental analysis of the resulting copolymer revealed C: 55.25%, H: 6.13% and N: 5.18%, which were in good accordance with the calculated value of the 1:1 alternating copolymer, that is, C: 55.11%, H: 6.05%, and N: 4.94%.

Similar results were obtained when sodium p-vinyloxybenzene sulfonate, potassium p-allyloxybenzenesulfonate or potassium p-methallyloxybenzenesulfonate was used in place of potassium p-styrenesulfonate.

EXAMPLE 5

Sixty m-mole of methylmethacrylate and 15 ml. of a heptane solution containing 5 m-mole of ethylaluminum dichloride were added to a four-necked glass flask having a capacity of 100 ml. provided with a stirrer at —78° C. under a nitrogen atmosphere and sufficiently mixed. Then, 80 m-mole of sodium β-methylvinylsulfonate was added thereto and further 0.4 m-mole of vanadium oxydichloride was added thereto as a polymerization promoter. Then, the reaction was continued for 20 hours. The polymerization reaction was stopped with hydrochloric acid-acidified methanol, and then the formed copolymer was separated, washed with water and dried, whereby 0.81 g. of the copolymer was obtained. Sulfur analysis of the resulting copolymer by a fluorescent X-ray analytical method revealed that the sulfonic acid content of the copolymer was 35.3%, which was in good accordance with the calculated value, 36.7%, of the 1:1 alternating copolymer.

EXAMPLE 6

Thirty m-mole of acrylonitrile (AN) and 30 m-mole of methyl acrylate (MA) were added as monomers of Group B into a four-necked glass flask having a capacity of 100 ml. provided with a stirrer at —20° C. under a nitrogen atmosphere, and further 12 m-mole of ethylaluminum sesquichloride (6 g. in 100 ml. of a toluene solution) as a catalyst, 1.3 g. of benzoyl peroxide as a polymerization promoter and 10 ml. of o-chlorobenzene as a solvent were added thereto and uniformly mixed. Then, 60 m-mole of sodium methallylsulfonate (MAS) was added as monomer of Group A thereto, and elevated to 25° C. with good stirring. The reaction was continued for 10 hours, and then the reaction was stopped with hydrochloric acid-acidified methanol. The formed copolymer was separated and purified, whereby 3.25 g. of the copolymer product was obtained.

The resulting copolymer was insoluble in the ordinary organic solvent, but soluble in nitrile acid. The intrinsic viscosity of said copolymer in 13 N nitric acid at 30° C. was 0.32 dl./g. The sulfonic acid content of said copolymer was 40.5%, which was in good accordance of the calculated value, 39.6%, in the case of the ideal alternating copolymer (AN:MA:MAS=25:25:50 by mole).

What is claimed is:

1. An alternating copolymer composed of at least one monomer [A] and at least one monomer [B], said copolymer comprising about 50 mole percent of Group [A] monomers, the remainder being Group [B] monomers, in which [A] monomers are selected from unsaturated compounds containing a sulfonic acid group having the following formula:

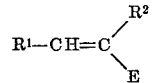

wherein $R^1$ and $R^2$ represent alkyl, aryl, aralkyl, cycloalkyl and bridged ring hydrocarbon residues having 1 to 20 carbon atoms, or those having halogen atoms as substituents, and a halogen atom or a hydrogen atom, at least one of $R^1$ and $R^2$ being a hydrogen atom; E is selected from —$SO_3Me$, —$R^3$—$SO_3Me$, —$R^3$—A—$SO_3Me$ and —A—$R^3$—$SO_3Me$; $R^3$ represents alkylene, phenylene or aralkylene groups having 1 to 20 carbon atoms or those having halogen atoms as substituents, A is —O—$R^4$— or —S—$R^4$— wherein $R^4$ has 1 to 20 carbon atoms and is alkylene, phenylene, aralkylene, alkylphenylene, cycloalkylene or a bridged ring hydrocarbon group, Me represents a monovalence-designated portion of the elements of Groups I to III of the Periodic Table or an ammonium group, and [B] monomers are selected from conjugated compounds having the following formula:

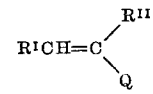

wherein $R^I$ and $R^{II}$ represent alkyl, aryl, aralkyl, alkylaryl, cycloalkyl and bridged ring hydrocarbon residues having 1 to 20 carbon atoms or those having halogen atoms as substituents, halogen atoms, hydrogen atoms, or $-(CH_2)_mQ$ wherein Q represents a nitrile or a group having the following formula:

$$-\underset{\underset{O}{\|}}{C}-Y^I$$

wherein $Y^I$ is selected from the group consisting of ZR, ZMe, NR'R'', R, and a halogen atom wherein Z represents an oxygen or sulfur atom; R, R' and R'' are selected from the group consisting of a hydrogen atom and alkyl, alkenyl, aryl, aralkyl, alkylaryl and cycloalkyl residues having 1 to 20 carbon atoms, including the case where R' and R'' are linked to each other also at a position other than the nitrogen atom; Me represents a monovalence-designated portion of the elements of Groups I to III of the Periodic Table or an ammonium cation; and wherein $m$ and $m'$ represent 1 or 2.

2. An alternating copolymer according to claim 1, wherein said [A] monomer is a salt of metal of Groups I to III of Mendeleev's Periodic Table or ammonium salt of a compound selected from the group consisting of alkenylsulfonic acid, alkenylhydrocarbylsulfonic acid, alkenylhydrocarbylsulfonic acid, alkenyloxyhydrocarbylsulfonic acid and halogen-substituted compounds thereof.

3. An alternating copolymer according to claim 1, wherein said [A] monomer is a metal salt of Groups I to III of Mendeleev's Periodic Table or ammonium salt of a compound selected from the group consisting of vinylsulfonic acid, allylsulfonic acid, styrenesulfonic acid, vinyloxyhydrocarbylsulfonic acid, allyloxyhydrocarbylsulfonic acid and compounds substituted with hydrocarbon radicals, halohydrocarbon radicals or halogen atoms thereof.

4. An alternating copolymer according to claim 1, wherein said [A] group monomer is a monovalent salt of a compound selected from the group consisting of alkenylsulfonic acid, alkenylbenzenesulfonic acid, and alkenyloxybenzenesulfonic acid.

5. An alternating copolymer according to claim 1, wherein the [A] group monomer is a sodium or potassium salt of a compound selected from the group consisting of vinyl sulfonic acid, allylsulfonic acid, methallylsulfonic acid, isopropenylsulfonic acid, $\beta$-methylvinylsulfonic acid, styrenesulfonic acid, toluenesulfonic acid, vinyloxybenzenesulfonic acid, allyloxybenzenesulfonic acid, and methallyloxybenzenesulfonic acid.

6. An alternating copolymer according to claim 1, wherein said [B] group monomer is selected from the group consisting of acrylonitrile, acrylic esters, thiolacrylic esters, acrylamides, acryloyl halides, acrylic acid, thiolacrylic acid, acrylic acid salts, thioacrylic acid salts, acrolein, vinylketones, and these compounds substituted with hydrocarbon or halohydrocarbon radicals, halogen atoms, $-CH_2Q$ or $-(CH_2)_2Q$ where Q is defined in the claim 1, in $\alpha$-, $\beta$- or $\alpha,\beta$-positions thereof.

7. An alternating copolymer according to claim 1, wherein said [B] group monomer is selected from the group consisting of acrylonitrile, acrylic esters, acrylamides, acrylic acid and these compounds substituted with hydrocarbon, halohydrocarbon, cyanoalkyl, carboxyalkyl, hydrocarbyloxyalkyl radicals or halogen atoms in $\alpha$-, $\beta$- or $\alpha,\beta$-positions thereof.

8. An alternating terpolymer composed of one monomer selected from the group [A] monomer defined in the claim 1, one monomer selected from the group [B] monomer defined in the claim 1, and one monomer of group [A'] selected from the group consisting of $\alpha$-olefins, styrenes, dienic hydrocarbons, unsaturated esters of carboxylic acids and halogen-substituted compounds thereof and having 2 to 30 carbon atoms; and [A] group monomer units are linked only to [B] or [A'] group monomer units and [B] and [A'] group monomer units are linked only to the group [A] monomer units.

9. A process for producing a copolymer of unsaturated compounds having sulfonic acid groups and conjugated vinyl compounds, which comprises contacting and polymerizing at least one monomer of the group [A] defined in claim 1, and at least one monomer of the group [B] defined in claim 1, with (1) an organometallic halogen compound having the following general formula:

$$MR^{III}_nX_{3-n}$$

wherein M represents an aluminum or boron atom, $R^{III}$ has 1 to 20 carbon atoms and in alkyl, alkenyl, aryl, aralkyl, alkylaryl or cycloalkyl, X represents a halogen atom and $n$ represents any value of from 1 to 2 or a mixture of at least two kinds of compounds having the following general formulae:

(a) $MR^{III}_nX_{3-n}$
  (b) $M'R^{IV}_3$ and
  (c) $M''x'_3$ wherein M, M' and M'' represents aluminum or boron atoms; $R^{III}$ is defined above and $R^{IV}$ has 1 to 20 carbon atoms and is alkyl, alkenyl, aryl, aralkyl, alkylaryl or cycloalkyl, X and X' represent halogen atoms; and $n$ represents any value of from 1 to 2, or (2) a complex of conjugated monomers coordinated with organometallic halogen components obtained by mixing (a') organometallic compounds of metals of Groups IIb, IIIb or IVb of the Periodic Table and (b') halogen compounds of metals of IIb or IVb of the Periodic Table, wherein at least one kind of the compounds (a') and (b') is an aluminum or boron compound, in the presence of at least the conjugated monomers of the Group B among said monomers to allow these components to come in contact with one another.

10. A process according to claim 9, wherein the polymerization is carried out at a temperature from $-150°$ C. to $+100°$ C.

11. A process according to claim 9, wherein the polymerization is carried out in an inert solvent.

12. A process according to claim 11, wherein the inert solvent is hydrocarbons or hydrocarbons containing halogen atoms.

13. A process according to claim 9, wherein the catalyst is used in an amount of 0.001 to 10 moles per mole of the monomers of Group B.

14. A process according to claim 9, wherein the polymerization is effected in the presence of at least one promoter selected from oxygen, an organic peroxide, and a compound of a transition metal of Groups IVa, Va, VIa VIIa or VIII of Mendeleev's Periodic Table having at least one radical selected from the group consisting of a halogen atom, alkoxy, $\beta$-diketo and acyloxy radical.

15. A process according to claim 14, wherein the promoter is used in an amount of 0.001 to 20 mole percent on the basis of the monomers of Group B.

16. A process according to claim 9, wherein the organometallic compound designated as the catalyst component (a') is selected from compounds having the formula:

$$M'''R^V_nX''_{p-n}$$

wherein M''' represents a metal of the Groups IIb, IIIb and IVb of the Periodic Table; $R^V$ has 1–20 carbon atoms and is alkyl, alkenyl, aryl, aralkyl, alkylaryl or cycloalkyl; X'' represents a halogen atom; $p$ represents a valence of the metal; $n$ is any value of 1 to $p$, and the metal halogen compound designated as the catalyst component (b') is selected from compounds having the formula:

$$M^{IV}X'''_mR^{VI}_{q-m}$$

wherein $M^{IV}$ represents a metal of Groups IIIb and IVb of the Periodic Table, X''' represents a halogen atom; $R^{VI}$ has 1 to 20 carbon atoms and is alkyl, alkenyl, aryl, aralkyl, alkylaryl or cycloalkyl; $q$ represents the valence of the metal; and $m$ is any value from 1 to $q$.

References Cited

UNITED STATES PATENTS

| 3,318,830 | 5/1967 | Condon | 260—29.6 |
|---|---|---|---|
| 3,426,104 | 2/1969 | Masson | 260—895 |
| 3,505,290 | 4/1970 | Mazzolini | 260—63 |

FOREIGN PATENTS

| 910,136 | 11/1962 | Great Britain | 260—79.3 |
|---|---|---|---|
| 1,123,725 | 8/1968 | Great Britain | 260—79.7 |

JOSEPH L. SCHOFER, Primary Examiner

C. A. HENDERSON, Jr., Assistant Examiner

U.S. Cl. X.R.

260—2.2 R, 63 R, 67 UA, 78.5 R, 503, 505 R

UNITED STATES PATENT OFFICE
CERTIFICATE OF CORRECTION

Patent No. 3,657,201         Dated April 18, 1972

Inventor(s) Kenji TAKEYA, Yoshihiro UNO, and Akira YAMANE

It is certified that error appears in the above-identified patent and that said Letters Patent are hereby corrected as shown below:

Please correct claim 8 to read as follows:

8. An alternating terpolymer composed of one monomer selected from the group [A] monomer defined in the claim 1, one monomer selected from the group [B] monomer, defined in the claim 1, and one monomer of group [A'] selected from the group consisting of $\alpha$-olefins, styrenes, dienic hydrocarbons, unsaturated esters of carboxylic acids and halogen-substituted compounds thereof and having 2 to 30 carbon atoms; and [B] group monomer units are linked only to [A] or [A'] group monomer units and [A] and [A'] group monomer units are linked only to the group [B] monomer units.

Signed and sealed this 19th day of September 1972.

(SEAL)
Attest:

EDWARD M. FLETCHER, JR.
Attesting Officer

ROBERT GOTTSCHALK
Commissioner of Patents